3,582,495
Patented June 1, 1971

3,582,495
TREATMENT OF HYDROPHILIC POLYMERIC CAPSULE WALL MATERIAL WITH VANADIUM COMPOUNDS
Donald Day Emrick, Kettering, Ohio, assignor to The National Cash Register Company, Dayton, Ohio
No Drawing. Continuation-in-part of application Ser. No. 586,943, Oct. 17, 1966. This application Jan. 29, 1968, Ser. No. 701,129
The portion of the term of the patent subsequent to Apr. 27, 1986, has been disclaimed
Int. Cl. A01n 17/00; B01j 13/02; B44d 1/44
U.S. Cl. 252—316
6 Claims

ABSTRACT OF THE DISCLOSURE

A process is provided for manufacturing novel, minute, capsules, en masse, wherein existing capsules having walls of water-swellable, hydrophilic, polymeric material are further treated by uranium- or vanadium-containing ions in an aqueous liquid supporting vehicle. Capsules produced by practice of this process have walls which exhibit decreased swelling in water and decreased sensitivity to high relative humidity.

CROSS-REFERENCE TO RELATED PATENT APPLICATION

This is a continuation-in-part patent application of United States patent application Ser. No. 586,943, filed Oct. 17, 1966.

BACKGROUND AND SUMMARY OF THE INVENTION

This invention pertains to a method for improving the physical characteristics of minute capsules by treating, en masse, poly(vinyl alcohol)-containing capsule wall material wherein the treatment materials comprise aqueous vanadyl ions, containing ions, and to the capsule product thereby produced.

It more specifically relates to the treatment, in an aqueous medium, of such capsule walls of poly(vinyl alcohol) material while said walls are in a solvent-swollen state, and wherein the treatment utilizes aqueous solutions of the treatment materials. The novel treatment involves the reaction, by coordination bonding, of oxygen atoms of carboxyl, hydroxyl, carbonyl or ether groups which may be present in the polymeric material with dissolved vanadyl ions. Coordination bonding or complexing between the metal ions and the capsule wall materials, as mentioned above, results in a water-insoluble polymeric material which has qualities admirably adapted for use as capsule walls in cases where good retention of volatile capsule contents in high humidity environments is required.

It had been found, through a study, by applicant, of the mineralization of the bone structure and other tissue of fossil remains of living matter, that such remains evidently selectively extracted, out of the matrix material and the ground waters in which such were embedded, the minerals vanadium and uranium where such were available. It was deduced by applicant that the protein matter was involved, and this led to a suspicion, later justified by experiment, that the precursors and decomposition products of gelatin were involved. Thereupon the use of salts of uranium and vanadium was tested with respect to the treatment of the delicate coacervate gelatin-containing membranes surrounding minute capsules made en masse according to the teachings of Barrett K. Green as disclosed in U.S. Pat. No. 2,800,458, issued July 23, 1957, and reissued on Nov. 29, 1960, as Re. 24,899. Surprisingly good results were obtained from the use of salts having uranyl ($UO_2^{++}$) and vanadyl ($VO^{++}$) ions.

Applicant, by extrapolation of results from the above-mentioned study, found that other polymeric materials, not limited to those materials having amino and amido chemical groups, can also be reacted with salts of vanadium and uranium. Such other materials, when treated by the process of this invention also result in polymeric material which is substantially water-insoluble and has qualities admirably adapted for use as capsule walls.

The complexing of hydrophilic polymeric material is preferredly accomplished by treatment in water with water-soluble uranyl ($UO_2^{+2}$) and vanadyl ($VO^{+2}$) and can be accomplished by using certain other transition metal compounds having inner electron orbitals which are capable of coordinating with atoms in the previously mentioned chemical groups which may be present in hydrophilic polymeric material. The resultant wholly or partially metal-ion-complexed polymeric material (either in the presence or in the absence of other, mutually compatible, polymeric material components such as negatively charged polyelectrolytes, e.g., gum arabic, carrageenan, hydrolyzed copolymers of ethylene and maleic anhydride, hydrolyzed copolymers of methyl vinyl ether and maleic anhydride, or hydrolyzed copolymers of styrene and maleic anhydride, which may or may not react with the transition metal ions) displays decreased water solubility, decreased swelling, and decreased sensitivity to high humidity relative to the same polymeric material in the absence of the subject transition metal complexing reaction.

The processes of this invention and the encapsulation products obtained therefrom are as useful for industrial applications and in the arts and sciences as are the encapsulation techniques and the encapsulated products therefrom described in the aforesaid U.S. Pat. No. 2,800,458, as well as what is described in U.S. Pat. No. 2,800,457, issued July 23, 1957, on the application of Barrett K. Green and Lowell Schleicher, to which reference is made. Capsules manufactured by the novel process are used for the same purposes as untreated capsules; that is, to contain adhesive solvents and adhesive systems, to protect delicate and reactive chemicals and compositions, and to serve as minute dispensing and containing units for various materials and mixtures of materials. Utility of minute capsules is also described at some length in the publication "NCR Capsules Have Wide Possibilities," an article published in the NCR Factory News, October 1959, a publication of The National Cash Register Company, Dayton, Ohio, United States of America. The subject treated capsule walls have been found to exhibit improved characteristics with regard to retention and protection of the contained materials and, in that respect, allow a broadening of the possibilities for usefulness of encapsulated materials in the protected minute entity form, especially in the case of high relative humidity capsule storage conditions.

Eligibility of a material for being encapsulated in an aqueous medium depends upon low water solubility and chemical inertness to the various hydrophilic-polymeric-capsule-wall-forming materials. Included as a few examples of the vast number of materials which can be encapsulated by the novel method are inorganic solids such as water-insoluble salts and oxides, pigments, and minerals; organic solids such as water-insoluble polymeric materials, high-molecular-weight fats and waxes, and other, more complex, materials, including insecticides, rubbers, adhesives, catalysts, and the like; and liquids such as toluene, xylene, hexane, carbon tetrachloride, silicone fluids, methyl salicylate, lemon oil, mineral oil, and the like.

It is believed that imbibition of water or water vapor into capsule walls of hydrophilic, polymeric materials is an important factor in the loss of volatile capsule contents by diffusion through the wall. Capsule walls which have been treated by the novel method are more hydrophobic than untreated capsule walls; that is, the treated capsule walls are not so subject to the wall-swelling effects of moisture, humidity, and the consequent diffusion through the wall of capsule contents as are the untreated capsule walls. The novel treated capsules exhibit improved retention of capsule contents at moderate temperatures and over the whole range of relative humidity conditions, the improved retention being more dramatically demonstrated as the relative humidity is raised above 85 percent. Tests, under carefully controlled high relative humidity (85 to 95 percent) conditions, have shown that the novel treated capsule wall material retains volatile organic solvents to a markedly more successful degree than does the same capsule wall material left untreated. It is, therefore, an object of this invention to provide a method for preparing, en masse, minute capsules having hydrophilic polymeric material capsule walls of poly (vinyl alcohol) chemically treated and characterized by improved resistance, in high humidity environments, to loss of capsule contents by diffusion through the wall.

The polymeric material-complexing metal compound can be dissolved into intended liquid capsule core material prior to dispersion of the said core material into droplets in an aqueous solution of the hydrophilic polymeric material. The complexing metal ions in solution in the core entity droplets meet and complex with the polymeric material at the interface between the core entity droplets and the solution of polymeric material, thus forming a skin or membrane around individual droplets which can serve as a capsule wall.

It is an object of this invention to provide such a method utilizing an interfacial interaction for the en masse preparation of minute capsules having, as capsule walls, a complexed polymeric material comprising a hydrophilic film-forming material and a complexing metal compound.

In another, and preferred, case, a previously or independently phase-out hydrophilic polymeric material from a homogeneous solution including poly (vinyl alcohol) may be subsequently treated with a solution of a water-soluble, polymeric material-complexing metal compound, of the type specified, in order to accomplish the desired complexing or degree of complexing—the degree of such complexing being regulated by control of the pH, temperature, and component concentration; by proper selection of the complexing metal compound used; or by the duration of exposure to or contact with solutions of the metal compound, or alternately, by either incremental, regulated, or otherwise limited addition of said complexing metal compound, or by otherwise regulating the contact duration and mode of contact.

It is a further object of this invention to provide such a method for the post-treatment of the embryonic capsule walls by the use of poly (vinyl alcohol)-complexing vanadyl compounds.

In connection with any of the above-mentioned procedures utilizing poly(vinyl alcohol) capsule wall materials, additional—optional—treatments or capsule wall modification procedures can be utilized with the subject polymeric material-complexing reactions. One type of such capsule wall treatment is to further effectively harden or cross-link the polymeric material or its complexes present in the capsule walls as will be described hereinbelow. In order to modify or ameliorate any tendency for undesirable wall embrittlement due to the novel polymeric material-complexing reaction, with or without additional hardening or cross-linking, known polymer plasticizers may be incorporated with the polymeric material; (a) previous to the polymeric material-complexing reaction, (b) during the complexing, or (c) as a post-treatment after the polymeric material complexing has been accomplished. A group of such plasticizers includes soluble plant gums, such as gum arabic; mono-, di-, and poly-saccharide sugars; polyhydric alcohols such as mannitol or sorbitol made by the reduction of such sugars; alkylene glycols or glycol derivatives; glycerol; or certain highly polar hydrophilic solvents such as phthalonitrile, acetamide, formamide, dimethylformamide, dimethylsulfoxide, which either may or may not competitively complex with the same metal ions used to complex the hydrophilic polymeric components of the capsule wall material.

Examples of soluble metal compounds suitable for complexing films of hydrophilic poly(vinyl alcohol) polymeric material include: vanadyl formate, vanadyl acetate, vanadyl sulfate, and vanadyl halides.

U.S. Pats. numbered 3,258,442, issued June 28, 1966; 3,264,245, issued Aug. 2, 1966; and 3,265,657 issued Aug. 9, 1966, all on the applications of Harold Sinclair, teach formation of rigid gel from a solution of poly(vinyl alcohol) by treatment of the poly(vinyl alcohol) with metallic ions such as vanadium, titanium or chromium. The rigid gels formed by the above Sinclair inventions are of a gross nature, that is, an entire, continuous, mass of poly(vinyl alcohol) solution is homogeneously, rigidly, gelled as a single phase. However, those disclosures are not directed first to the formation of capsules, having walls of such hydrophilic polymeric materials first formed and thereafter treated by the metal ions.

With the above objects and description in mind, specific examples will now be disclosed, from which further features of the invention will become apparent to those skilled in the art. It is understood as obvious, that the use of specific materials in the following examples serves an illustrative purpose and is not intended to limit the broad scope of this invention in any way.

DESCRIPTION OF THE PREFERRED EMBODIMENTS

Example 1

Into a vessel having a capacity of one-liter and equipped for agitation and heating were placed 150 milliliters of 11 percent, by weight, aqueous solution of gum arabic and 150 milliliters of aqueous poly(vinyl alcohol) solution. The poly(vinyl alcohol) solution was prepared as follows: 1.0 gram of about 86,000-molecular weight poly(vinyl alcohol) characterized by having a viscosity of about 28 to about 32 centipoises in a 4 percent, by weight, aqueous solution at 20 degrees centigrade and by being 99 to 100 percent hydrolyzed (such as the material designated as "Elvanol 71–30" sold by E. I. du Pont de Nemours and Co., Wilmington, Del., United States of America) and 6.5 grams of about 125,000-molecular weight poly(vinyl alcohol) characterized by having a viscosity of about 35 to about 45 centiposies in a 4 percent, by weight, aqueous solution at 20 degrees centigrade and by having 87 to 89 percent hydrolyzed (such as the material designated as "Elvanol 50–42" sold by E. I. du Pont de Nemours and Co., Wilmington, Del., United States of America) were dissolved in enough water to make a total volume of 150 milliliters of solution. Agitation was begun in the system and 50 milliliters of dioctyl phthalate, the intended internal phase for this example, was added. The agitation was adjusted to yield 100 to 1,000-micron droplets of the liquid internal phase. One-hundred milliliters of 5 percent, by weight, aqueous solution of resorcinol was added directly to the system and the system was heated to about 40 degrees centigrade over a duration of a few minutes to allow formation of the poly(vinyl alcohol)/resorcinol complex. Two hundred milliliters of 10 percent, by weight, aqueous sodium sulfate (anhydrous basis) solution was then slowly added while the agitating system was permitted to slowly cool to room temperature. The addition of sodium sulfate solution caused liquid-liquid phase separation of the poly(vinyl alcohol)-containing complex and the separated complex wet and enwrapped the dispersed particles of the intended internal phase material. Finally 100 milliliters of 5 percent, by weight, aqueous vanadyl sulfate dihydrate solution was added to the system, which system now contained capsules. Ten milliliters of concentrated ammonia solution was added to the system to adjust the pH to about 4.0 and cause chemical cross-linking of the poly(vinyl alcohol) with the vanadium compound. The capsules, now with solid, hardened, walls were separated from the manufacturing vehicle by filtering and were then dried on a forced air blower.

Example 2

In this example, capsules were prepared using substantially the same materials as were used in Example 1 with the exception that gallic acid was substituted for the resorcinol of Example 1. The capsules of this example are also made to be much smaller than those of Example 1.

Into a Waring Blendor cup having a capacity of about one-liter were placed 50 milliliters of dioctyl phthalate—the material to be encapsulated—and 150 milliliters of aqueous poly(vinyl alcohol) solution. The poly(vinyl alcohol) solution used was as specified in Example 1. The Blendor was turned on and the dioctyl phthalate was emulsified in the poly(vinyl alcohol) solution until dioctyl phthalate particles were obtained which were 1 to 10 microns in diameter. The contents of the Blendor cup were then transferred to a vessel of one-liter capacity, equipped for agitation, which contained 150 milliliters of 11 percent, by weight, gum arabic solution. The Blendor cup was rinsed with 100 milliliters of water and that rinsewater was also added to the vessel. To the agitated dispersion of dioctyl phthalate in poly(vinyl alcohol) and gum arabic solution was added, in a dropwise manner, 200 milliliters of 2.5 percent, by weight, aqueous gallic acid solution followed by 20 milliliters of 5 percent, aqueous sodium sulfate solution. Addition of the solutions resulted in liquid-liquid phase separation of the poly(vinyl alcohol)/gallic acid complex which wet and enwrapped the particles of dioctyl phthalate to form capsules. The capsule walls were then chemically cross-linked by addition, to the agitated dispersion, of 50 milliliters of 5 percent, by weight, aqueous vanadyl sulfate dihydrate solution and 7 milliliters of concentrated aqueous ammonia solution. The resulting slurry of very small capsules dispersed in the manufacturing vehicle was coated onto paper sheets and dried to make a coating of capsules having a dry appearance and feel. The coating, nevertheless, yielded liquid dioctyl phthalate in areas on the sheet where capsule-rupturing pressures were applied.

Examples 1 and 2, above, appear in United States patent application Ser. No. 701,128, filed in the name of Robert G. Bayless on the same date as the continuation-in-part patent application herein, and assigned to the assignee herein. The above-mentioned patent application claims, as patentable subject matter, a method for manufacturing the minute capsules, en masse, wherein the capsule wall material is a complexed product of poly(vinyl alcohol) and polyhydroxy aromatic material but does not claim the after-treatment claimed herein. The Examples 1 and 2, are utilized herein to demonstrate the transition-metal treatment of poly(vinyl alcohol)-containing capsule walls which is the gist of the invention claimed in the present patent application as pertains to poly(vinyl alcohol).

Example 3

Into a vessel having a capacity of approximately 1500 milliliters and equipped for agitation were placed 100 milliliters of water, 9.9 grams of 2-methyl-2, 4-pentanediol (sometimes named hexylene glycol), and 5.2 grams of ortho-boric acid powder. The mixture was agitated until the boric acid was dissolved—about 15 minutes— which indicated substantial reaction of the boric acid with the glycol to yield the 1:1-type (glycol groups:boron constituents) of mono (2-methyl-2,4-pentanediol) mono borate. To this solution of cyclic borate ester, were then added 50 milliliters of trichlorobiphenyl—the liquid capsule internal phase material for this example— 10 grams of urea to serve as an anti-aggregation agent, 200 milliliters of 11 percent, by weight, aqueous gum arabic solution and 150 milliliters of poly(vinyl alcohol) solution. The poly(vinyl alcohol) solution was prepared as follows: 1.5 gram of about 86,000-molecular weight poly(vinyl alcohol) characterized by having a viscosity of about 28 to about 32 centiposies in a 4 percent, by weight, aqueous solution at 20 degrees centigrade, and by being 99 to 100 percent hydrolyzed (such as the material designated as "Elvanol 71–30" sold by E. I. du Pont de Nemours and Co., Wilmington, Del., United States of America) and 6 grams of about 125,000-molecular weight poly(vinyl alcohol) characterized by having a viscosity of about 35 to about 45 centiposies in a 4 percent, by weight, aqueous solution at 20 degrees centigrade and by being 87 to 89 percent hydrolyzed (such as the material designated as "Elvanol 50–42" sold by E. I. du Pont de Nemours and Co., Wilmington, Del., United States of America) were dissolved in enough water to make a total volume of 150 milliters of solution. The agitation was adjusted to produce particles of the capsule internal phase material approximately 500 microns in diameter. At this point in the example, the dispersed particles had acquired liquid capsule walls of poly(vinyl alcohol)/cyclic borate ester complex—the liquid-liquid phase separation having had occurred at the time that the poly(vinyl alcohol) solution was added to the agitating system. After continuing agitation for approximately 5 minutes, 160 milliliters of 15 percent, by weight, aqueous sodium sulfate solution was added to the system in a dropwise fashion over a duration of 15 to 20 minutes. The sodium sulfate solution caused the liquid capsule walls to shrink or dehydrate and greatly increase in viscosity. Finally, 100 milliliters of an aqueous solution having a pH of 3.9 to 4.0 and containing 7.5 grams of sodium sulfate and 5 grams of vanadyl sulfate dihydrate were added to the system of dispersed capsules and the pH of the manufacturing vehicle was then adjusted to about 4.5 to cause chemical cross-linking of the poly(vinyl alcohol) with the vanadium compound. The capsules, now with solid, hardened, walls were separated from the manufacturing vehicle by filtration, washed with cold water and spread on an absorbent surface to dry in the laboratory environment. The capsule product consisted of free-flowing and apparently dry, individual capsules which yielded trichlorobiphenyl when ruptured.

Example 4

Into a vessel having a capacity of approximately 1500 milliliters and equipped for agitation and heating were placed 100 milliliters of water, 40 milliliters of 14 percent, by weight, aqueous acetic acid, 400 milliliters of 11 percent, by weight, aqueous gum arabic solution, 20 grams of urea to serve as an anti-aggregation agent, 300 milliliters of aqueous poly(vinyl alcohol) solution having the kinds and concentrations of poly(vinyl alcohol) as were in the poly(vinyl alcohol) solution of Example 3, and 20 milliliters of bis(2-methyl-2,4-pentanediol) diborate. The mixture was agitated and heated to about 55 degrees centigrade for a few minutes during which time a very viscous liquid phase of poly(vinyl alcohol)/borate complex separated from the manufacturing vehicle. It is believed to be true, though not important to practice of this invention, that the cyclic borate ester of this initially-formed viscous-liquid separated phase was included in a closely-knit poly(vinyl alcohol)-containing complex as just-hydrolyzed and partially-hydrolyzed material of both the 2:2- and the 1:1-types (glycol groups: boron constituents). Agitation in the mixture was continued and the system was allowed to cool to about 25 degrees centigrade, over a duration of about 30 minutes at which time the liquid separated phase appeared to be fluid and of a viscosity acceptable for manufacturing capsules. Again, although not necessary to practice of this invention, it is believed that, during the course of the above heating and cooling steps, the 2:2 anhydride cyclic borate ester became completely hydrolyzed to the 1:1 cyclic borate ester.

and the complex approached an equilibrium with the manufacturing vehicle with regard to solubilities of the complex and of individual components. The above, fluid, separated phase can be obtained without heating the system by permitting the system to agitate for several hours, on the order of a few days. One-hundred milliliters of toluene—the capsule internal phase for this example—was added to the encapsulating system, once established. The agitation was adjusted to yield dispersed particles of capsule internal phase having diameters of about 500 to 1000 microns and the agitation was continued for about 1.5 hours during which time the separated liquid phase wet and enwrapped the particles to form liquid-walled capsules. Next, in order to shrink and partially dehydrate the liquid capsule walls, 160 milliliters of 15 percent, by weight, aqueous solution of sodium sulfate was added to the system in a dropwise fashion over a duration of about 40 minutes. A solution of 10 grams of vanadyl sulfate dihydrate in 200 milliliters of 7.5 percent, by weight, aqueous sodium sulfate solution was added over a 20-minute duration, immediately followed by an amount of concentrated aqueous ammonia solution to adjust the pH of the system to 4.0 in order to provide optimum conditions for cross-linking the poly(vinyl alcohol)- containing capsule walls with vanadyl ions. The system of now solid-walled capsules dispersed in manufacturing vehicle was agitated for an additional 25 minutes and chilled to about 10 degrees centigrade. The capsules were separated from the manufacturing vehicle by filtering, were washed with 600 milliliters of cold water, and the capsule walls were dried by placing the capsules in a forced air dryer. The capsule product of this example was much like that of Example 3 in appearance except, of course, the capsules yielded toluene instead of trichlorobiphenyl when they were ruptured.

Examples 3 and 4 above, appear in United States Patent application Ser. No. 701,127, filed on the same date as this continuation-in-part patent application, in the names of Robert G. Bayless and Donald D. Emrick, and assigned to the assignee herein. Donald D. Emrick of the above patent application, Ser. No. 701,127, is the same inventor as the inventor herein. The above-mentioned patent application claims, as patentable subject matter, a method for manufacturing the minute capsules, en masse, wherein the capsule wall material is a complexed product of poly(vinyl alcohol) and alkylene glycol cyclic borate ester which capsule wall material has been deposited onto intended capsule core entitles as a result of liquid-liquid phase separation. Examples 3 and 4, which correspond to Examples 1 and 2 in the above-mentioned patent application, are utilized herein to demonstrate the transition metal treatment of already made poly(vinyl alcohol)-containing capsule walls which is a part of the invention claimed in the present patent application.

Example 5

Into a vessel having a capacity of about 1500 milliliters and equipped for agitation were placed 200 milliliters of 11 percent, by weight, aqueous gum arabic solution (having a pH of 4.4), 10 grams of urea to act as an anti-aggregation agent, and 150 milliliters of 5 percent, by weight, aqueous poly(vinyl alcohol) solution. The poly(vinyl alcohol) solution was prepared as follows: 1.5 grams of about 86,000-molecular weight poly(vinyl alcohol) characterized by having a viscosity of about 28 to about 32 centipoises in a 4 percent, by weight, aqueous solution at 20 degrees centigrade, and by being 99 to 100 percent hydrolyzed (such as the material designated as "Elvanol 71-30" sold by E. I. du Pont de Nemours and Co., Wilmington, Del., United States of America) and 6.0 grams of about 125,000-molecular weight poly(vinyl alcohol) characterized by having a viscosity of about 35 to about 45 centipoises in a 4 percent, by weight, aqueous solution at 20 degrees centigrade and by being 87 to 89 percent hydrolyzed (such as the material designated as "Elvanol 50-42" sold by E. I. du Pont de Nemours and Co., Wilmington, Del., United States of America) were dissolved in enough water to make a total volume of 150 milliliters of solution. To the above agitating system was added, in dropwise fashion over a duration of about 20 minutes, a solution of 5 milliliters of bis(2-methyl-2,4-pentanediol) diborate dissolved in 45 milliliters of dioctyl phthalate—the capsule internal phase. The alkylene glycol cyclic borate ester of this example was prepared by reaction of 2-methyl-2,4-pentanediol (sometimes named hexylene glycol) with boric acid according to the technique taught by Samuel M. Darling et al., in U.S. Pat. No. 2,741,548 issued Apr. 10, 1956. The diborate material readily reacts with moisture and, for that reason, the diborate solution in dioctyl phthalate was protected from atmospheric moisture until it was used. The agitation was adjusted to yield liquid particles of diborate in dioctyl phthalate solution of 500 to 1000 microns in diameter and the temperature of the system was maintained at approximately 25 degrees centigrade. Particles of the internal phase solution which were dispersed in the agitating manufacturing vehicle developed capsule walls of gelled poly(vinyl alcohol)/borate complex formed at the interface of the manufacturing vehicle and the particles. The gelled capsule walls in this example were relatively highly swollen and to shrink the capsule wall material prior to chemical hardening, 150 milliliters of 15 percent, by weight, aqueous sodium sulfate solution was added in dropwise fashion over a duration of about 45 minutes. Following the addition of sodium sulfate, 100 milliliters more of the sodium sulfate solution was added, over a duration of about 35 minutes, which solution, additionally had 5 grams of vanadyl sulfate dihydrate dissolved in it. Five milliliters of concentrated aqueous ammonium was then dissolved in 95 milliliters more of the sodium sulfate solution and was slowly added to the system to optimize conditions for the capsule wall hardening treatment. After the system had agitated for about 20 hours, the capsules were separated from the manufacturing vehicle, were washed twice with cold water, and were spread on an absorbent surface to dry in the laboratory environment (about 25 degrees centigrade and 50 percent relative humidity). The capsule product was free-flowing, apparently dry, individual capsules which yielded liquid dioctyl phthalate when ruptured.

Example 6

The same procedure as above in Example 5 was followed utilizing the same materials as to kind, concentration and amount except that xylene was substituted for the dioctyl phthalate as capsule internal phase.

The capsule product of the above Examples 5 and 6 and other capsule products whose walls have been reacted with transition metal ions, can be utilized in practice of an invention which is the subject of United States patent application Ser. No. 701,126, filed on the same date herewith in the name of Donald D. Emrick, the same inventor as herein, and assigned to the assignee herein, wherein capsules whose walls have been treated with transition metal ions are further treated by generation of polymeric material grafted to the capsule wall material at sites of transition metal ions and, thereby, grown interstitially within the molecular units of the capsule wall material.

Examples 5 and 6, above, have been selected from United States patent application Ser. No. 701,130, filed on the same date as the continuation-in-part patent application herein, in the names of Robert G. Bayless and Donald D. Emrick, and assigned to the assignee herein. Donald D. Emrick, of the above patent application Ser. No. 701,130, is the same inventor as the inventor herein. The above-mentioned patent application Ser. No. 701,-130 claims, as patentable subject matter, a method for manufacturing minute capsules, en masse, in a liquid manufacturing vehicle, wherein the capsule wall material is a complexed product of poly(vinyl alcohol) and alkylene glycol cyclic borate ester which capsule wall material has been formed by a complexing reaction occurring at the interface between the manufacturing vehicle and particles of intended capsule core entities dispersed therein. The Examples 5 and 6, which correspond to Examples 1 and 2 in the above-mentioned patent application, are utilized to demonstrate the transition metal treatment of the poly(vinyl alcohol)-containing capsule walls which is the gist of the invention claimed in the present patent application as pertains to treatment of capsules previously made by interfacial complexing.

It can be understood, from the preceding examples, that the process of the invention is broad in its general application to the treatment of capsules having poly(vinyl alcohol) in the walls. Treatment material concentrations have been shown to be variable over a wide range, and combinations of different vanadyl treatment materials can be successfully used. The temperature of treatment is variable, depending on materials and concentrations, within the wide range of about 0 to 55 degrees centigrade or perhaps slightly higher—25 to 30 degrees centigrade being used in the examples for convenience of operation. The poly(vinyl alcohol)-containing capsule walls to be treated can include a variety of materials and can include one or more hydrophilic materials, plasticized or not, and can optionally be chemically hardened prior to the treatment provided by this invention.

What is claimed is:

1. A process for treating, en masse, the poly(vinyl alcohol)-containing hydrophilic polymeric material walls of minute capsules with an aqueous solution of vanadyl ions, said treatment improving retention and protection characteristics of the capsule walls and consisting of the steps of:
   (a) establishing an agitated aqueous system of such capsules having water-swollen walls,
   (b) introducing into the system, once established, the aqueous solution of said vanadyl ions, and
   (c) maintaining the system for a time sufficient to accomplish complexing of capsule wall material with treatment material.

2. A minute capsule having a wall comprising the product of reaction between at least one poly(vinyl alcohol) - containing hydrophilic polymeric material and vanadyl ions.

3. The process of claim 1 wherein the capsule walls have been chemically hardened prior to the treatment.

4. The capsule of claim 2 wherein said capsule wall also contains a plasticizing material.

5. A process for treating capsules having capsule walls of oxygen - containing hydrophilic polymeric material wherein the oxygen is present in the hydrophilic polymeric material as at least one kind of oxygen - containing chemical group taken from the list of chemical groups consisting of hydroxyl, carboxyl, carbonyl, ester, and ether, said treatment improving retention and protection characteristics of the capsule walls and comprising the steps of:
   (a) establishing an agitated aqueous system of the capsules having water-swollen walls,
   (b) introducing into the system, once established, an aqueous solution of vanadyl ions as the treatment material, and
   (c) maintaining the system for a time sufficient to accomplish complexing of capsule wall material with treatment material.

6. A minute capsule having capsule wall material comprising the product of reaction between oxygen-containing chemical groups present in at least one hydrophilic polymeric material included in said capsule wall material and vanadyl ions.

References Cited
UNITED STATES PATENTS

| | | | |
|---|---|---|---|
| 2,800,458 | 7/1957 | Green | 252—316 |
| 3,092,553 | 6/1963 | Fisher et al. | 252—316X |
| 3,264,245 | 8/1966 | Sinclair | 252—316X |

FOREIGN PATENTS

| | | | |
|---|---|---|---|
| 929,404 | 6/1963 | Great Britain | 252—316 |

RICHARD D. LOVERING, Primary Examiner

U.S. Cl. X.R.

117—62.2, 100; 424—33, 34, 37

UNITED STATES PATENT OFFICE
CERTIFICATE OF CORRECTION

Patent No. 3,582,495  Dated June 1, 1971

Inventor(s) Donald D. Emrick

It is certified that error appears in the above-identified patent and that said Letters Patent are hereby corrected as shown below:

Column 3, line 40, "phase-out" should be --phased-out--; Column 4, line 52, "having" should be --being--; Column 5, line 56, before "are" should be inserted --which correspond to Examples 1 and 2 in the above-mentioned patent application, --; Column 8, line 33, "ammonium" should be --ammonia--.

Signed and sealed this 14th day of December 1971.

(SEAL)
Attest:

EDWARD M. FLETCHER, JR.  ROBERT GOTTSCHALK
Attesting Officer  Acting Commissioner of Patents